Dec. 1, 1925.
R. H. HUTCHINSON
BRAKE BAND FOR MOTOR VEHICLES
Filed Aug. 7, 1923
1,563,368
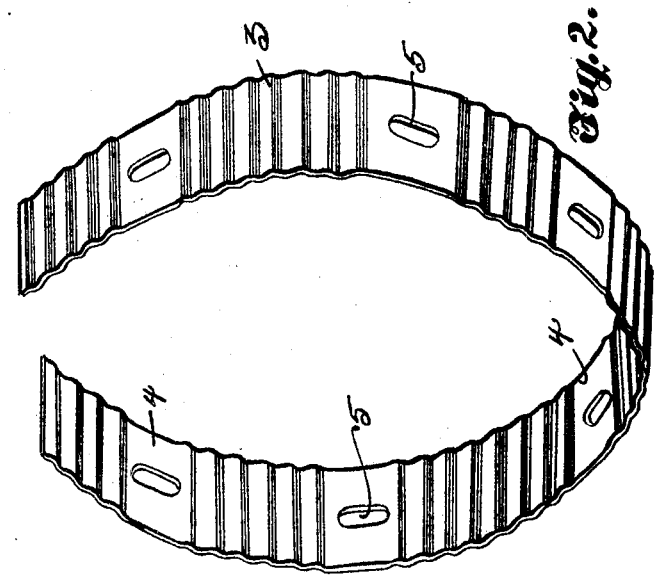
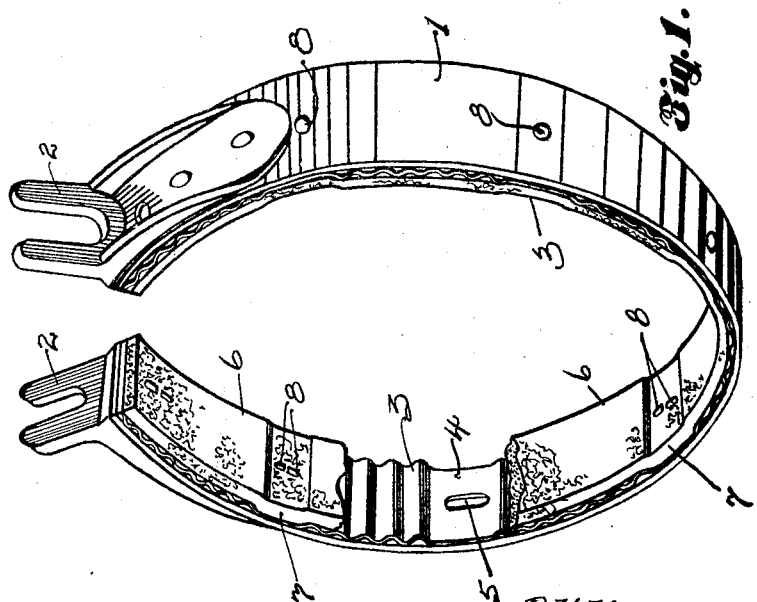
R. H. Hutchinson
INVENTOR.
BY John M. Spellmay
ATTORNEYS.

Patented Dec. 1, 1925.

1,563,368

UNITED STATES PATENT OFFICE.

ROBERT H. HUTCHINSON, OF DALLAS, TEXAS.

BRAKE BAND FOR MOTOR VEHICLES.

Application filed August 7, 1923. Serial No. 656,296.

*To all whom it may concern:*

Be it known that I, ROBERT H. HUTCHINSON, a citizen of the United States, residing at Dallas, in the county of Dallas and State of Texas, have invented certain new and useful Improvements in Brake Bands for Motor Vehicles, of which the following is a specification.

This invention relates to improvements in brake mechanism of motor vehicles and pertains more particularly to brake bands.

The object of the invention is to provide a brake band which is so constructed that its gripping power is greatly increased and made more positive and also providing an economical means for accomplishing this purpose.

These particular features of the invention will be better understood by reference to the following description, taken in connection with the accompanying drawings, forming part hereof in which—

Figure 1 is a perspective view of the improved brake band with part of the lining broken away; and Figure 2 is a perspective view of a corrugated collar for maintaining an even pressure of the brake lining.

Referring to the drawings in detail, 1 denotes a brake band of usual form with forked lugs 2—2 for connection to the brake rod and wheel hub of a motor vehicle.

Around the inside of the brake band 1 is a corrugated strip of metal 3 provided with spaced recesses 4—4 and slots 5—5. This strip is for the purpose of affording sufficient resiliency against the lining member 6 as to cause it to tightly grip the brake hub evenly all around when the brakes are applied on the vehicle. The lining member 6 is also provided with outwardly directed projections 7—7 fitting into the recesses 4 and is riveted at 8—8 to the brake band 1 through the slots 5—5. The purpose of the slots 5 is to permit the corrugated strip 3 to spread or flatten out since this must be provided for when pressure is applied on the brakes. Owing to the provision for continuing the corrugated strip all around the brake band 1 the gripping effect is uniform and equal and is greatly increased.

What is claimed is—

1. In a device of the character described, in combination with a brake band and brake lining of a motor vehicle, of an annular metallic corrugated strip provided with slots and recesses and interposed between said band and lining and adapted to provide annular pressure evenly around said brake lining to cause the brake lining to tightly grip the wheel hub when the brake is applied, said strip being of substantially the same diameter as the brake band and lining.

2. A brake band member comprising a transversely corrugated spring, a contracting band about the spring, rivets spaced apart lengthwise of the contracting band and the spring and adapted to connect the same together, and a friction strip mounted on the spring for contact with a drum, said spring being adapted to press said friction strip at spaced narrow points against the drum and arranged to broaden said points of contact as the contracting band is drawn taut.

3. A brake band liner comprising a contracting band, a corrugated spring arranged against the inner side of the band, a friction strip arranged against the inner side of the spring and conforming to the inner surface thereof, the inwardly bowed portions of the spring being adapted to engage said friction strip against a drum and arranged to gradually flatten the strip on the drum as the pressure increases to increase the surface area of contact, the corrugations of the spring being adapted to equalize pressure thereof through the spring to uniformly bind the friction strip on the drum.

4. A brake band liner comprising a contracting band, a corrugated spring fitting in the band, a friction strip mounted on the spring, rivets securing the friction strip and the spring to said band and being spaced apart lengthwise of the band a distance equal to a plurality of the corrugations of the spring to admit the settling and equalizing of the pressures of the high points of the spring against the friction strip when contracted upon a drum.

5. A device for backing brake linings comprising a transversely corrugated spring adapted to be interposed between a brake band and a brake lining, said spring having rivet receiving openings therein and spaced apart a distance equal to a plurality of the corrugations of the spring.

In testimony whereof I have signed my name to this specification.

ROBERT H. HUTCHINSON.